Patented Mar. 9, 1943

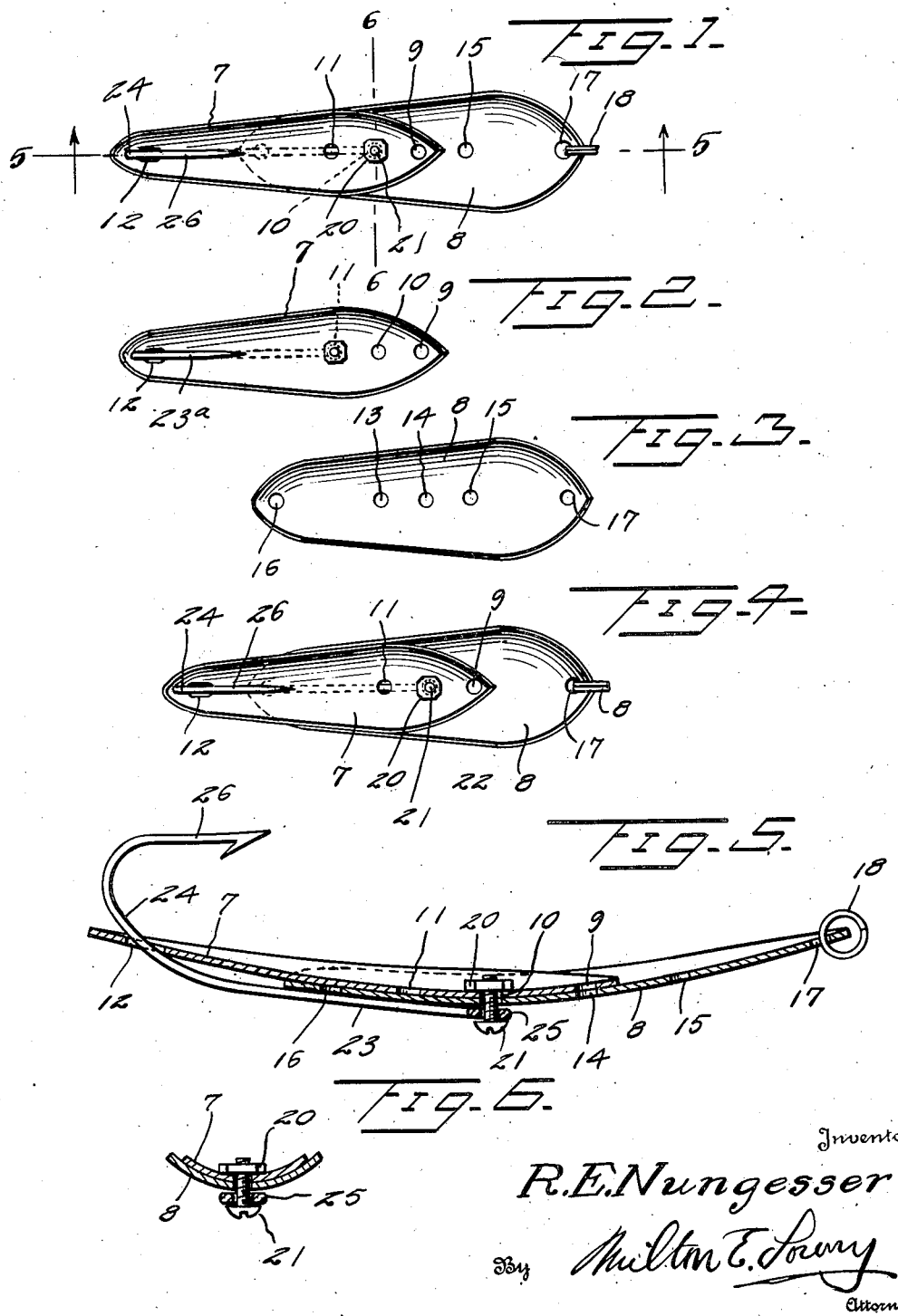

2,313,572

UNITED STATES PATENT OFFICE 2,313,572

FISH LURE

Robert E. Nungesser, Washington, D. C.

Application January 6, 1942, Serial No. 425,789

6 Claims. (Cl. 43—45)

The present invention relates to improvements in fish lures and more particularly to that type of lure known as a trolling spoon.

The primary object of the invention is to provide a fish lure capable of being longitudinally adjusted to various lengths so that the spoon may be used as a lure for different species of fish.

A further object of the invention is to provide a fish lure of the above-mentioned type comprising a pair of co-extensive lure parts capable of being adjusted relative to length so that the fish hooks of different sizes may be attached to the lure by a common fastening screw which holds the co-extensive lure parts in their adjusted positions.

A still further object of the invention is to provide a fish lure comprising a pair of overlapping lure elements, each of which is provided with a series of openings for adjusting the lure as to length and each of such elements are shaped as to be capable of use individually as a lure when the parts are disconnected or separated.

A further object of the invention is to provide a fish lure which may be capable of assuming various sizes and which may be adaptable for the reception of fish hooks proportionate in size to the size of the lure.

Other objects and advantages of the invention will become apparent during the course of the following description of the accompanying drawing, wherein, Figure 1 is a bottom plan view of a fish lure constructed in accordance with the invention, showing the manner in which the two overlapping parts are commonly connected to maintain the fish hook in position;

Figure 2 is a bottom plan view showing one of the lure elements attached and showing the manner in which the hook is secured thereto to form a lure of a smaller size;

Figure 3 is a bottom plan view of the other portion of the lure element, shown in Figure 1, illustrating the same detached and showing the opening for receiving a hook commensurate with the size of the lure;

Figure 4 is a bottom plan view again showing the lure elements connected in such a manner as to reduce the overall length of the lure;

Figure 5 is a longitudinal cross-sectional view taken on line 5—5 of Figure 1, looking in the direction of the arrows, illustrating in detail the manner in which the lure elements are assembled and showing the hook attached to the common connecting bolt; and Figure 6 is a transverse cross-sectional view taken on line 6—6 of Figure 1, looking in the direction of the arrows, and further illustrating in detail the manner in which the lure elements are connected.

In the drawing, wherein for the purpose of illustrating the invention and wherein like reference characters will be employed to designate like parts throughout the same, the reference characters 7 and 8 will generally be employed to designate a pair of similarly shaped lure elements, each of which is formed concavo-convex throughout its length and is preferably formed of metal such as stainless steel to provide a series of reflecting surfaces.

The lure element 7 is slightly smaller than the lure element 8 so that when the same are connected as shown in Figures 1 and 4, the element 7 will form or provide a continuation of the element 8 simulating a single lure.

The element 7 is provided with apertures 9, 10 and 11 equi-distantly spaced and longitudinally arranged adjacent the widest end of the lure 7 and the free end or smallest end is provided with a slot-like opening 12 for the passage of a fish hook.

The other lure element 8 is provided with a series of openings 13, 14 and 15 equi-distantly spaced and longitudinally arranged in the centralmost portion of the lure. In addition, each end of the lure 8 is provided with an opening, as at 16 and 17, for the passage of a fish hook and the attachment of a swivel connection 18 respectively.

When employing the trolling spoon for deep sea fishing or for catching the variety of larger fish, the lure elements 7 and 8 may be connected as shown in Figure 1 wherein the openings 10 and 13 are aligned so that a nut and bolt connection 20 and 21 may extend therethrough to hold the parts in their assembled position. The shank 23 of a fish hook 24 has its eye as at 25 also aligned with the opening 10 and 13 for being commonly connected with the bolt and nut connection 21 and 20. A fish hook 24 may extend through the opening 12 in the lure section so that its barbed end 26 may extend on the underside of the lure.

As shown in Figure 4, another set of openings are aligned, such as 10 and 15 to reduce the length of the lure so that the same may be used for a smaller fish and the hook 24 is arranged in substantially the same manner as is shown in Figs. 1 and 5 and the sections 7 and 8 are connected by the nut and bolt connection 21 and 22 respectively. It will thus be seen that the lure may be adjusted by varying the location and position of the series of openings 9, 10 and 11 with respect to the openings 13, 14 and 15 so that five possible lengths may be provided by simply adjusting the location of the various pairs of openings and anchoring the fish hook in place by passing the bolt 21 through the eye thereof so that the barbed end of the hook 26 will be disposed at the right location.

Each section 7 and 8 may be employed as a lure element by attaching the hook 23 to either section by means of the bolt 21 and in either case, a leader line may be attached to the lure by passing the same through the opening 9 in the lure element 7 or the opening 18 of the lure element 8. Suitable swivel connections may be provided in the leader line in the usual manner. By thus using either section 7 or 8, two more sizes of lure may be provided and may be used when trolling for smaller types of fish.

The hook 23a, shown in Fig. 2, is provided with a slightly reduced shank portion so that it is obvious that hooks of various sizes may be employed commensurate with the size of lure selected and the lure sections 7 and 8 may be arranged so that substantially all sizes of hooks can be accommodated in making up a selected fish lure for trolling throughout a large range of dimensions according to the type of fish to be captured.

It is to be understood that the form of the invention herewith shown and described is to be taken as a preferred embodiment of the same and that various changes in the shape, size and arrangements may be made without departing from the spirit of the invention or the scope of the sub-joined claims.

I claim:

1. A fish lure comprising a pair of individual lure elements of concavo-convex form and of similar shape, one of said elements having larger dimensions than the other, a detachable connection for fastening the elements together whereby the same may be adjusted to various lengths, and a fish hook having its barbed end extending through one of said lure elements and its opposite end anchored to the detachable connection.

2. A fish lure comprising a pair of similarly shaped lure elements of different dimensions, a detachable connector for securing the elements together so that they may be adjusted to produce a lure of different lengths, and a fish hook having one end projecting through an opening formed in one of the sections and its opposite ends anchored to the detachable connection.

3. A fish lure comprising a pair of concavo-convex lure elements of substantially the same shape but of different dimensions, a detachable connector for securing the elements together whereby said elements may be adjusted to different sizes with respect to length, and a fish hook having its barbed end projecting through an opening in one of said elements and its opposite end anchored to the detachable connector.

4. A fish lure comprising a pair of individual concavo-convex lure sections of similar shape, one of which is slightly larger than the other, said sections having aligned openings arranged longitudinally and equi-distantly, a detachable bolt fastener adapted to extend through a pair of the openings after the sections have been adjusted longitudinally, and a fish hook having one end extending through one of said sections and its opposite end anchored to the bolt fastener.

5. In a device of the character described, a pair of lures longitudinally adjustably connected together to provide a unitary lure, means for securing the lures in adjusted position, a fish hook having one end interfittingly engaged with one of the lures and its opposite end detachably anchored to the lure elements by said securing means.

6. In a device of the character described, a pair of lures of similar shape but differently dimensioned longitudinally adjustably connected together to provide a unitary lure, means for securing the lures in adjusted position, a fish hook having one end interfittingly engaged with one of the lures and its opposite end detachably anchored to the lure elements by said securing means.

ROBERT E. NUNGESSER.